United States Patent
Pan et al.

(10) Patent No.: US 7,606,146 B1
(45) Date of Patent: Oct. 20, 2009

(54) METHOD AND APPARATUS FOR IMPLEMENTING A POLICY-BASED MANAGEMENT SYSTEM ON A NETWORK DEVICE

(75) Inventors: Yin Pan, Webster, NY (US); Al Villarica, Fairport, NY (US); Eric Edwards, West Henrietta, NY (US)

(73) Assignee: Nortel Networks Limited, St. Laurent, Quebec (CA)

( * ) Notice: Subject to any disclaimer, the term of this patent is extended or adjusted under 35 U.S.C. 154(b) by 915 days.

(21) Appl. No.: 09/638,373

(22) Filed: Aug. 15, 2000

(51) Int. Cl.
*H04J 3/14* (2006.01)
*G06F 15/173* (2006.01)
*G06F 15/16* (2006.01)

(52) U.S. Cl. .................. 370/229; 370/236; 709/226; 709/229

(58) Field of Classification Search ......... 370/229–231, 370/235, 236–236.2, 282, 351, 389, 395.2, 370/395.21, 395.54, 431, 438–439, 443–444, 370/461–462, 475, 226
See application file for complete search history.

(56) References Cited

U.S. PATENT DOCUMENTS

| | | | |
|---|---|---|---|
| 5,687,167 A * | 11/1997 | Bertin et al. ............... 370/254 |
| 5,956,342 A * | 9/1999 | Manning et al. ............ 370/414 |
| 6,163,807 A * | 12/2000 | Hodgkinson et al. ........ 709/229 |
| 6,341,127 B1 * | 1/2002 | Katsube et al. ............. 370/352 |
| 6,381,228 B1 * | 4/2002 | Prieto et al. ................ 370/323 |
| 6,459,682 B1 * | 10/2002 | Ellesson et al. ............. 370/235 |
| 6,483,835 B1 * | 11/2002 | Tanigawa et al. ....... 370/395.21 |
| 6,570,875 B1 * | 5/2003 | Hegde ......................... 370/389 |
| 6,643,258 B1 * | 11/2003 | Ise et al. ..................... 370/230 |
| 6,657,983 B1 * | 12/2003 | Surazski et al. ............. 370/337 |
| 6,661,806 B1 * | 12/2003 | Eriksson et al. ............. 370/468 |
| 6,708,209 B1 * | 3/2004 | Ebata et al. .................. 709/223 |
| 6,771,661 B1 * | 8/2004 | Chawla et al. ............... 370/468 |
| 6,785,728 B1 * | 8/2004 | Schneider et al. ........... 709/229 |
| 6,845,106 B2 * | 1/2005 | McKinnon et al. .......... 370/477 |
| 7,065,042 B1 * | 6/2006 | Pan et al. ..................... 370/229 |

* cited by examiner

*Primary Examiner*—Gregory B Sefcheck
(74) *Attorney, Agent, or Firm*—David A. Dagg

(57) ABSTRACT

Resources, such as bandwidth, are allocated on a network as follows. A request for reservation of network resources is received. The reservation includes a destination address on the network. Resources on network devices on a path to the destination address are allocated to accommodate the reservation if the network devices have sufficient resources to accommodate the reservation.

37 Claims, 12 Drawing Sheets

Scheduling a reservation

Reservation becomes due

Reservation expires

Terminating a reservation

Activating a service reservation

Terminating a service reservation

Creating a service reservation

Activating a service reservation

Terminating a service reservation

METHOD AND APPARATUS FOR IMPLEMENTING A POLICY-BASED MANAGEMENT SYSTEM ON A NETWORK DEVICE

BACKGROUND

This invention relates to an apparatus and corresponding method for managing resources on a network.

Network devices, such as routers, switches, and switching routers, direct packet traffic to its intended destination on the network. These devices, however, can become bottlenecks if they do not have sufficient resources (e.g., bandwidth) to accommodate the packet traffic. In such cases, packets can be lost or delayed, resulting in a degradation in the quality of service (QoS) of the network.

Devices currently exist which determine the available bandwidth on a network and which regulate packet traffic accordingly. These devices, however, determine the available bandwidth of the network as a whole, and not the available bandwidth of individual devices on the network. As a result, the QoS of the network is not necessarily improved. Other methods, which are able to allocate the bandwidth of individual devices, are not scalable.

In general, in one aspect, the invention is directed to allocating resources on a network. A request for reservation of network resources is received. The reservation includes a destination address on the network. Resources on network devices on a path to the destination address are allocated to accommodate the reservation if the network devices have sufficient resources to accommodate the reservation.

This aspect may include one or more of the following features. The network devices on the path to the destination address are determined. A map of a topology of the network is constructed and stored in memory. The network devices are determined and the resources are allocated by referencing the map. The map is constructed periodically to account for changes in the topology of the network.

This aspect also may include determining if the network service reservation is permitted based on an identity of a transferor, and allocating the resources if it is determined that the reservation is permitted. Resources are not allocated if it is determined that the reservation is not permitted. Filters are installed on the network devices to allocate the resources.

Data is received indicating a time that the resources are to be activated. The filters are installed at the time that the resources are to be activated. Resources are allocated on the network devices for different classes of service on the network. The different classes of service are defined in data packets to be transmitted over the network. The resources include bandwidth of devices on the network.

This aspect may also include determining if the destination address is along a path having greater than a predetermined amount of bandwidth. Resources are allocated or not allocated based on whether the path has greater than a predetermined amount of bandwidth. The resources may be allocated by communicating with the network devices using a protocol such as COPS/PR (Common Open Policy Service—Provisioning)

Other features and advantages of the invention will become apparent from the following description, including the claims and drawings.

DETAILED DESCRIPTION

Devices on a network may reserve network resources, such as bandwidth, on routers, switches, and the like, to accommodate packet traffic originating from those devices. The apparatus and methods described herein are employed to effect such reservations given inherent limitations of the network and availability of the resources.

Figure 1:
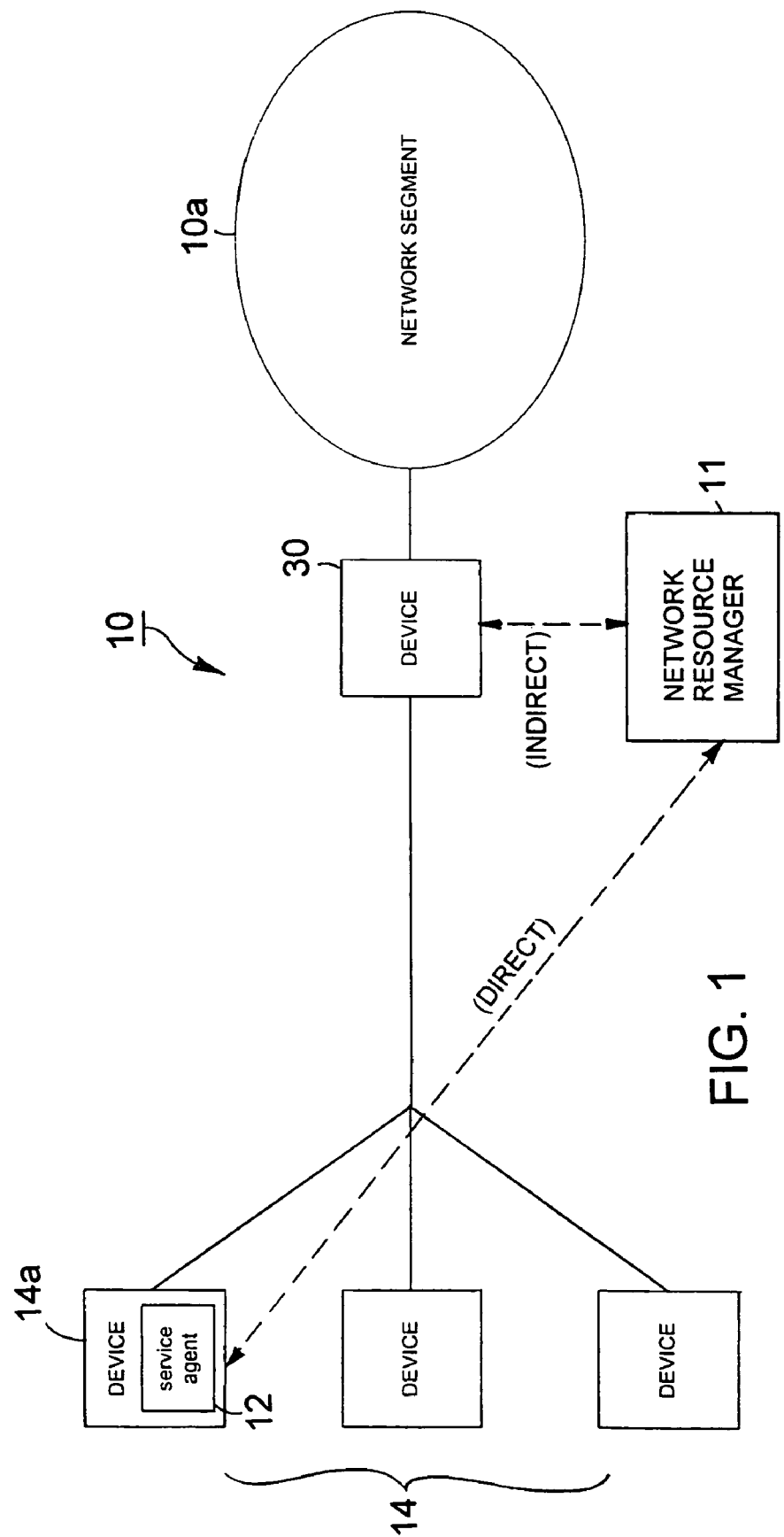
FIG. 1 is a block diagram of a network, which includes a network resource manager according to one embodiment of the invention.

Referring to FIG. 1, a network 10 is shown. Network 10 is a differentiated services network, such as the Internet, although a non-differentiated services network also may be used. A differentiated services network is a network in which different types of data packets are given different levels of priority for transmission through the network. For example, electronic commerce packet traffic or real-time packet traffic, such as streaming video, may be given higher priority than other types of packet traffic.

Network 10 includes network resource manager 11. Network resource manager 11 manages packet traffic over network 10 in accordance with specified rules, or "policies," to manage quality of service (QOS) on the network. In one embodiment, network resource manager 11 is a computer program running on one or more devices, such as a network server. Alternatively, network resource manager 11 may be implemented using programmable logic, such as an FPGA (Field Programmable Gate Array) or an ASIC (Application-Specific Integrated Circuit) embedded in a network device.

In operation, network resource manager 11 receives a "service reservation" from a service agent 12 running in one or more network devices 14. Network devices 14 may be individual personal computers (PCs) or other computing devices. Each device may run a separate copy of service agent 12 or service agent 12 may be run on several devices. The service reservation may be made through direct communication with the resource manager or indirectly by signaling through the network using an appropriate protocol, such as RSVP (Resource Reservation Protocol). In the case of indirect signaling, device 30 (of FIG. 1) receives the service reservation and outsources admission control to the resource manager using a protocol, such as COPS/RSVP (Common Open Policy Service—Resource Reservation Protocol).

The service reservation includes a request for a particular network service, such as bandwidth. For example, in one embodiment, the service reservation contains the following data: a network service type, token bucket parameters (e.g., sustained packet rate, peak packet rate, and bucket size), a service agent/user identifier (e.g., the service agent's network address, and encrypted user credential, or the like), a source identifier, such as an IP (Internet Protocol) address corresponding to the source of a packet transfer, and a destination identifier such the IP address corresponding to the destination of the packet transfer. The invention is not limited in this regard however, and the network service reservation may contain an additional or more limited amount of data depending upon the functionality and features available on the network resource manager. Optionally, the service reservation may also contain data specifying the time/duration during which resources for the service reservation are to be allocated; an authentication key for use in encrypting/decrypting the service reservation; a priority; and any other type of information that may be useful to the network resource manager in implementing network service reservations.

The service reservation is based on the size of the packet, the rate of transmission, and the class of service (CoS) of the packets being transferred. CoS defines the level of priority a packet is to be given during transmission through network 10. The CoS of a packet may be specified by marking the packet's header or otherwise modifying the packet's header so that the header becomes indicative of the relative priority of the packet. In this manner, higher priority packets may be given a higher priority during data transmission than lower priority packets.

Figure 2:
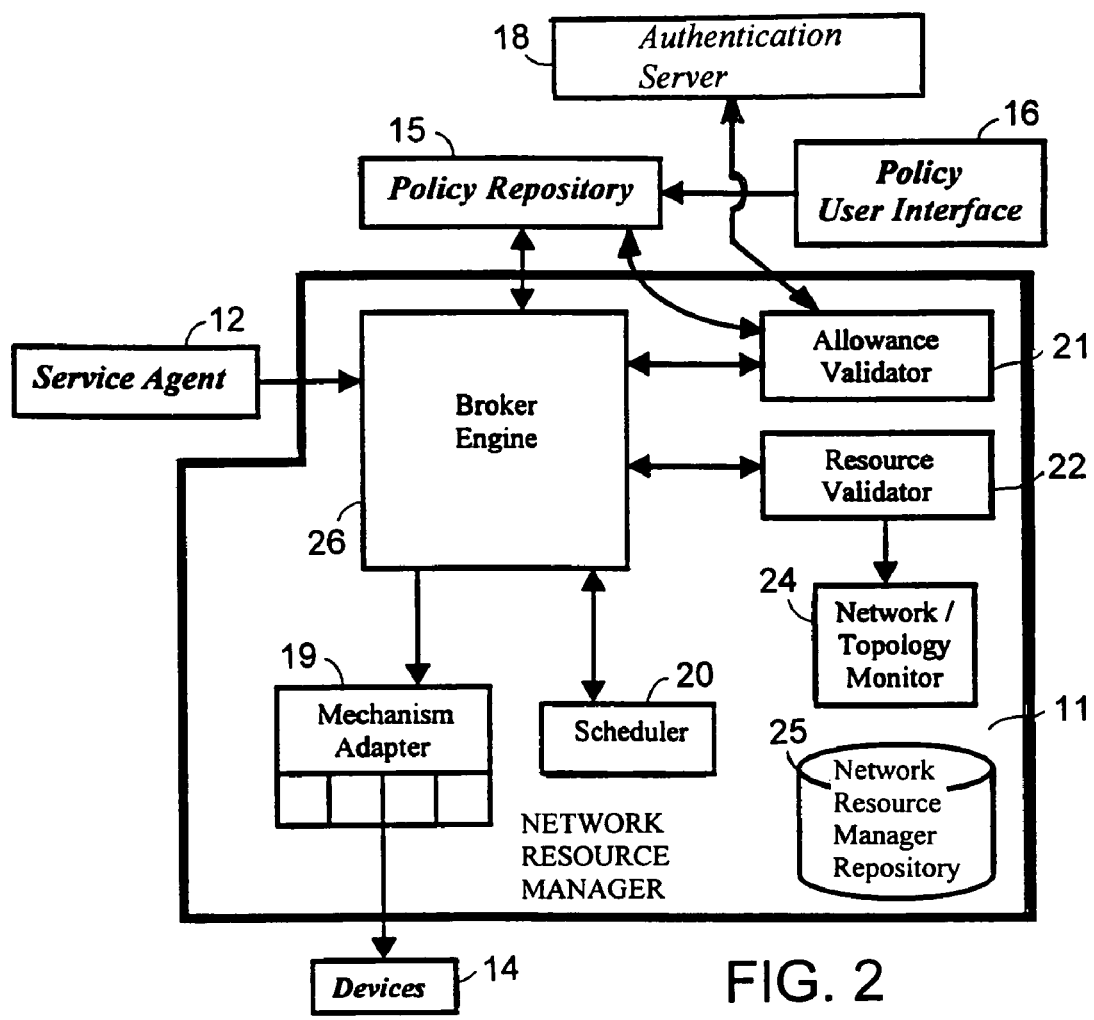
FIG. 2 is a block diagram showing software architecture of the network resource manager.

Referring to FIG. 2, upon receiving a service reservation, network resource manager 11 consults policies stored in policy repository 15 to determine if the service reservation should be granted or denied. Policy repository 15 is a memory or other storage device on network 10 that stores data for managing, accessing, and manipulating policies to provide specific network services.

Policy repository 15 includes a directory having data that defines policies for network 10. For example, the data may include network user data, network group data (meaning those users contained in predefined groups of network users), network service data, service reservations associated with pre-configured data packet flows, authentication data, and service provisions. A service provision is a set of rules that govern who on network 10 can request a service (called "authorization") and the maximum amount of network services available to a requestor or for a particular CoS (called "allowance"). A service provision includes data defining the user or group of users requesting service and, possibly, one or more of: a list of authorized services for the user or group and an association of a maximum number of instances of the service. Additional classes of data may also be included, and the invention is not limited to using this particular data or to a system configured to use only the listed data. In one embodiment, the directory in the policy repository is an LDAP-accessible directory, although other directories may be used.

A network administrator, or any other authorized user, may define the policies in policy repository 15. There are no limitations on the policies that may be defined, save for those inherent in the configuration of network 10. For example, policies may define available network services, service reservations for a specified time period, service reservations that are always active, service provisions that authorize reservations based on the identity of a user, and a maximum amount of services available to the user. Thus, for example, a network administrator can define policies indicating the time of day that an application, a user, or a group of users can access network resources (e.g., bandwidth) and/or the level of service (e.g., the amount of bandwidth) that can be accessed by that application, user, or group of users. Data is entered into policy repository 15 via policy user interface 16. Policy user interface 16 may be accessed via a network administrator's computer, which could be a stand-alone computer or one or more computers.

Network resource manager 11 communicates with policy repository 15 to access policies and other data using a suitable protocol. In one embodiment, communication takes place via LDAP (Lightweight Directory Access Protocol). Network resource manager 11 registers with policy repository 15 in order to retrieve policies and receive notification of policy changes.

Resource manager 11, more specifically allowance validator 21, communicates with authentication server 18 to determine whether the service agent/user is a valid entity and is allowed to make service reservations. In one embodiment, authentication server 18 is a Kerberos server.

As shown in FIG. 2, network resource manager 11 also includes mechanism adapter 19, scheduler 20, resource validator 22, network topology monitor 24, network resource manager repository 25, and engine 26. It is noted that other embodiments of the invention may combine and/or omit one or more of these elements, depending upon the functionality desired. In any case, the network resource manager is not limited to this particular software/hardware architecture.

I. Allocating Network Resources

Figure 3:
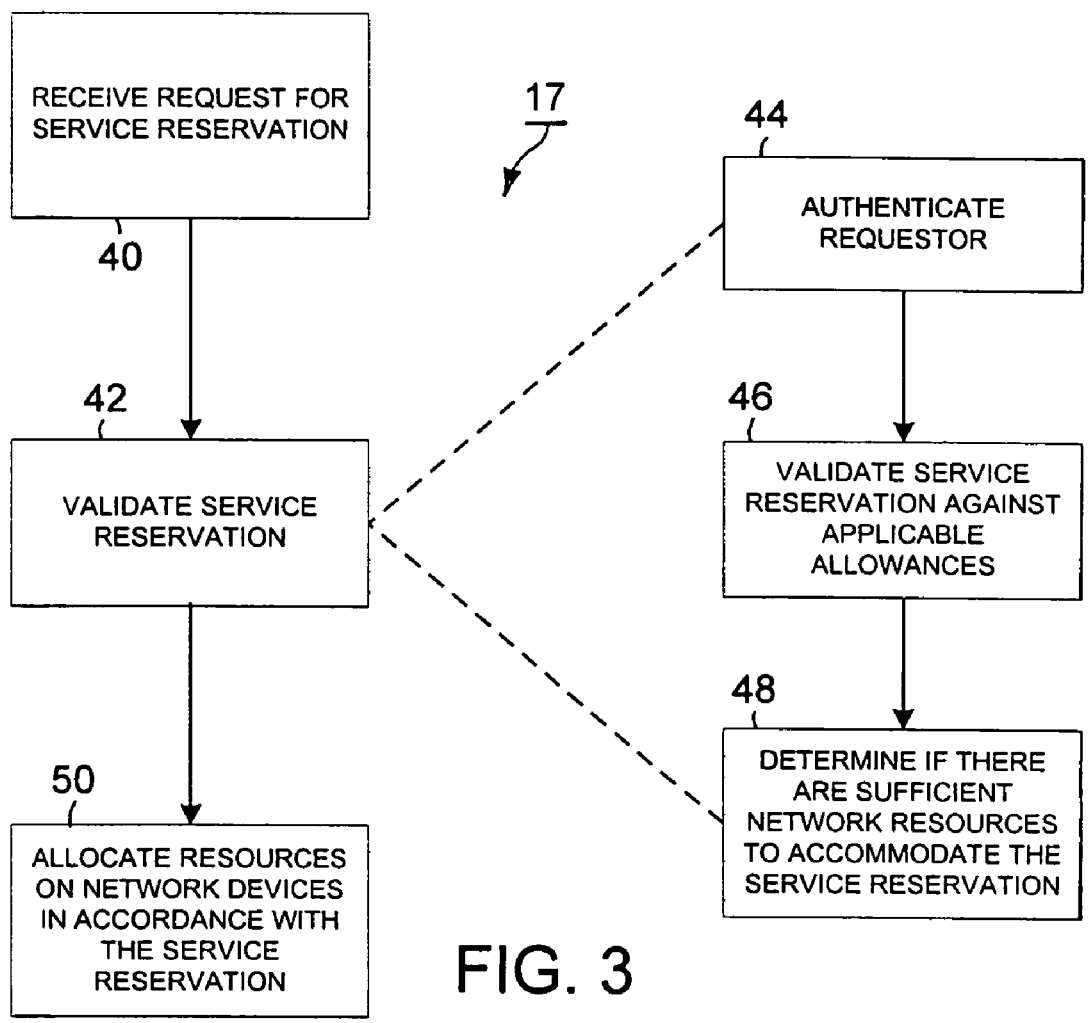
FIG. 3 is a flowchart showing a process for allocating network resources using the network resource manager.
Figure 4:
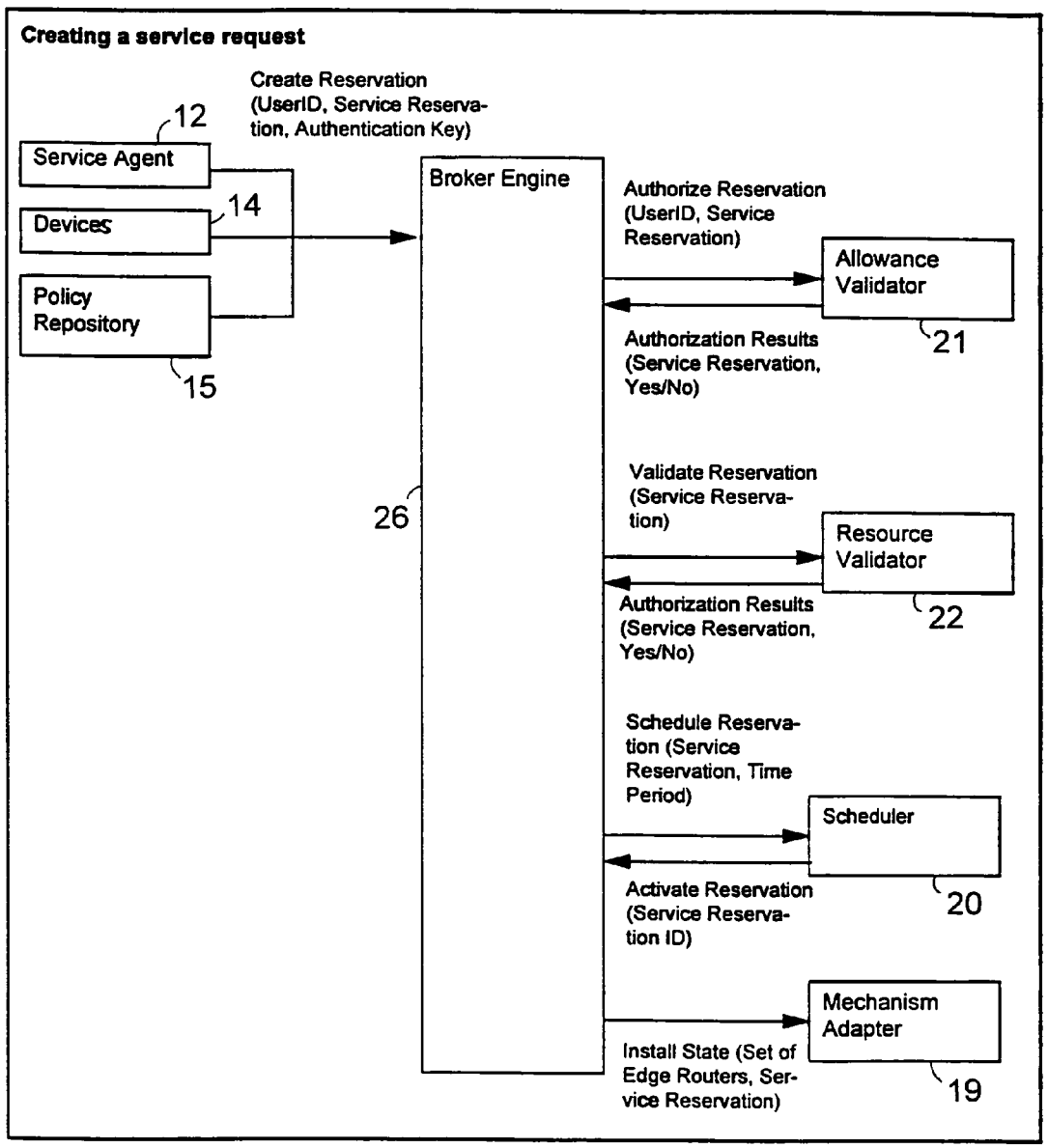
FIGS. 4 to 9 are block diagrams showing data flow among components of the network resource manager.

Referring to FIGS. 3 and 4, a process 17 that executes in engine 26 for allocating resources on a network is shown. Engine 26 is the control center of network resource manager 11. Engine 26 accepts service reservations, extends existing reservations, and deactivates reservations. Engine 26 interacts with service agent 12 to receive service reservations from applications running on network devices; with mechanism adapter 19 to receive implicit service reservations from devices that signal their requests through the network using protocols such as RSVP; and with allowance validator 21 to authenticate service reservation requesters and to authorize service reservations. Allowance validator 21 interacts with policy repository 15 to retrieve policies that control the allocation of network services. Engine 26 also interacts with resource validator 22 to validate service reservations based on the availability of network resources; with scheduler 20 to queue service reservations for future activation; and with mechanism adapter 19 to monitor network devices and to install service reservations on network devices.

As shown in FIG. 4, service agent 12, policy repository 15, and/or network devices 14 may cause engine 26 to produce or to extend service reservations. Referring to FIG. 3, engine 26 receives (40) service reservations and passes these requested service reservations to allowance validator 21 and resource validator 22, both of which validate (42) the requested service reservations. In particular, allowance validator 21 authenticates (44) the requestor, validates the reservation against applicable allowances (46), and informs engine 26 of the results. If allowance validator 21 determines that a reservation is valid, engine 26 passes the reservation to resource validator 22. Resource validator 22 validates (48) the reservation against available network resources. That is, resource validator 22 determines if there are sufficient network resources to accommodate the reservation. Resource validator 22 informs engine 26 of the results of its analysis.

Reservations that have passed validation by both allowance validator 21 and resource validator 22 are passed to mechanism adapter 19. Mechanism adapter 19 communicates with policy enforcement points (PEPs), such as network devices, applications, etc. that are necessary to allocate (50) resources to satisfy the requested service reservation. Valid "future" service reservations are forwarded to scheduler 20.

In this regard, a service reservation can be requested for current or future activation. If the service reservation is requested for future activation, engine 26 passes the reservation to scheduler 20, which schedules the reservation for future activation. At the time the reservation becomes due, scheduler 20 notifies engine 26 which, in turn, passes the reservation to mechanism adapter 19 for processing, as described below.

Figure 5:
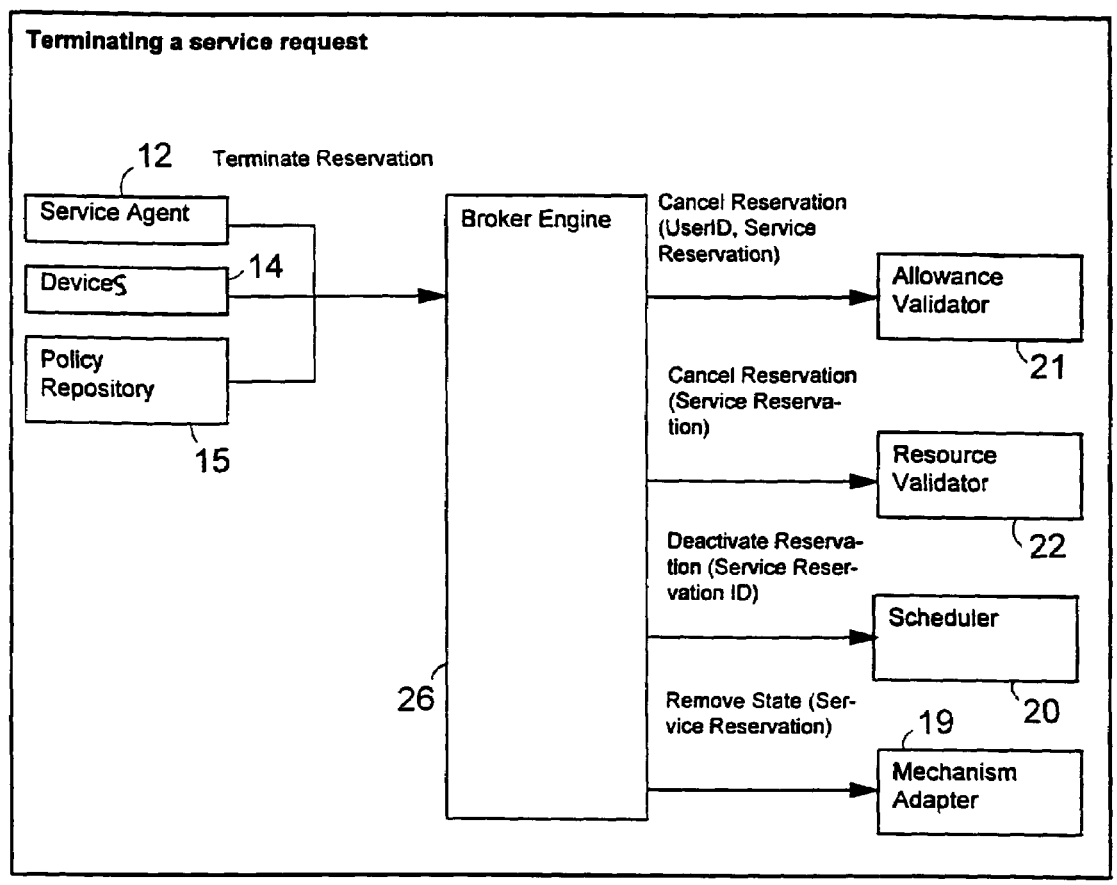

Referring to FIG. 5, engine 26 also receives reservation cancellations from service agent 12, network devices 14, and/or policy repository 15. In response to these cancellations, engine 26 notifies allowance validator 21 and resource validator 22 which, in turn, cancel any ongoing processes relating to a cancelled reservation. Engine 26 instructs mechanism adapter 19 to remove the cancelled reservation from the appropriate network PEPs and instructs scheduler 20 to deactivate the cancelled reservation if the cancelled reservation is a future reservation.

Figure 6A:
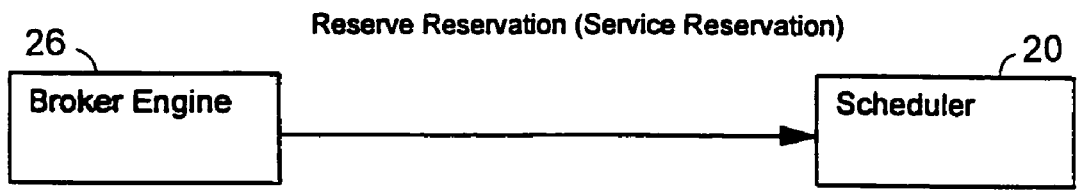
Figure 6B:
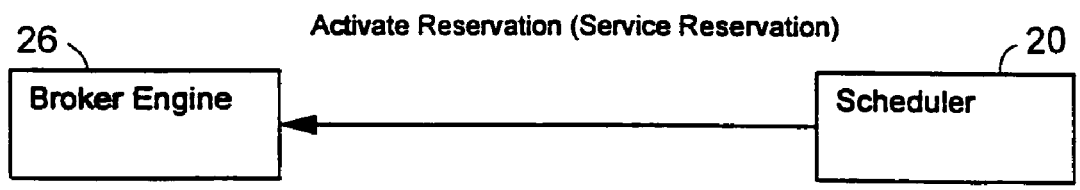
Figure 6C:
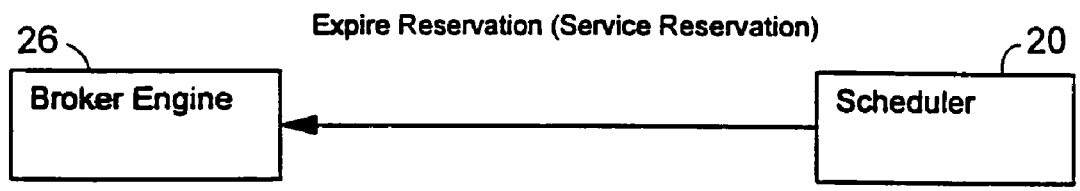
Figure 6D:
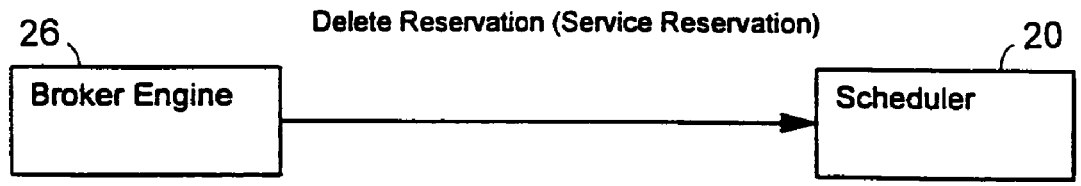

As noted, scheduler 20 receives and maintains data relating to future service reservations, as well as the end and lease times for current reservations. As shown in FIG. 6, once a future service reservation has been validated by allowance validator 21 and resource validator 22, engine 26 passes the reservation to scheduler 20 (FIG. 6A). Scheduler 20 receives the reservation and, when the reservation becomes due, scheduler 20 informs engine 26 and any other necessary components of network resource manager 11 (FIG. 6B). When a reservation expires, scheduler 20 informs engine 26 that the reservation should be deactivated (FIG. 6C). If a future reservation is deactivated, or an active reservation is terminated, engine 26 informs scheduler 20 (FIG. 6D). Scheduler 20 removes any events associated with such a reservation from the queue of scheduled events in network resource manager repository 25 (FIG. 7B).

Network resource manager repository 25 (FIG. 2) is accessible to each of the components of network resource manager 11, either directly or indirectly, through engine 26. Repository 25 may also store currently-allocated allowances and resources, currently-active service reservations, future allowance and resource allocations, future service reservations, auditing and accounting data, network topology maps, and provides a local cache for storing policy data retrieved from policy repository 15. Repository 25 may also store associations for currently-active service reservations, including the service configured for each service reservation, the amount of allowances left for each CoS per user and per group, the amount of allowances allocated for each CoS per reservation, the amount of bandwidth allocated for each CoS per link on network 10 and per reservation, and the amount of bandwidth left for each CoS per link. Optionally, repository 25 also maintains a log of events. For example, the log may contain instances of failure to meet a service reservation, changes in states of network 10, and communication failures between network devices. It is noted that the invention is not limited to storing all of the foregoing information or to storing such information in repository 25. Additional information may be stored, or less information may be stored, as required.

Figure 7A:
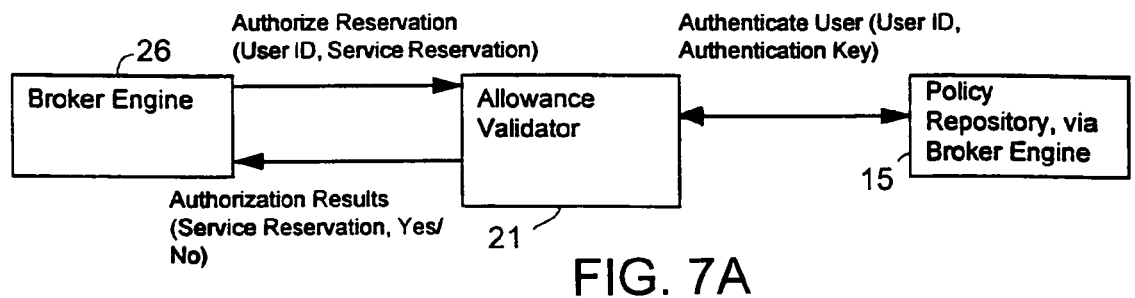
Figure 7B:
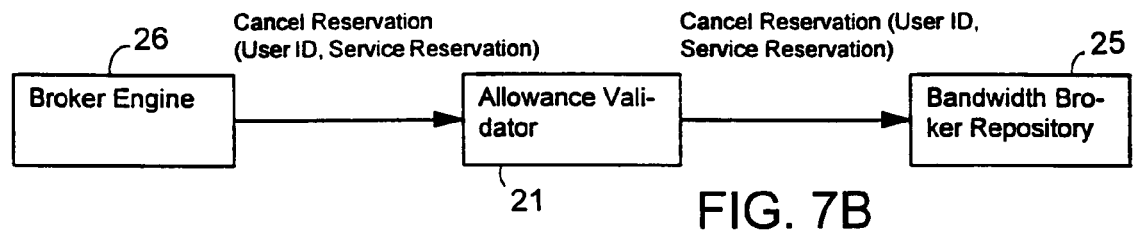
Figure 12:
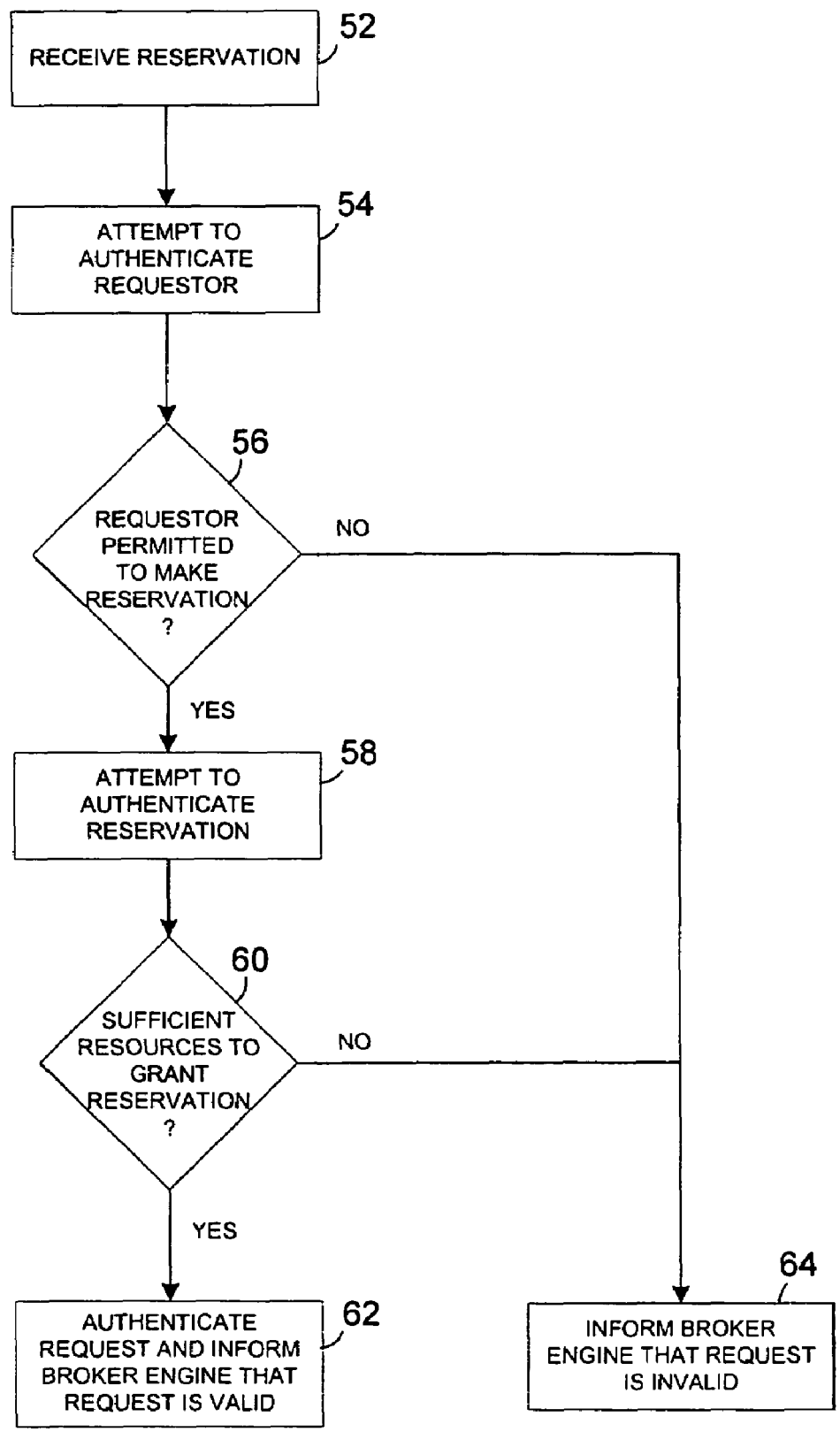
FIG. 12 is a flowchart showing a process performed in the network resource manager for authenticating a requestor of network resources and for authorizing a resource reservation.

Referring to FIGS. 7 and 12, allowance validator 21 interprets policies stored in policy repository 15 to determine the overall validity of a service reservation based on allowances and the authenticity of the requester. When a current or future service reservation is requested (FIG. 7A), engine 26 passes the reservation to allowance validator 21. Allowance validator 21 receives (52) the reservation and attempts (54) to authenticate the requester. To perform authentication, allowance validator 21 uses identification data present in the request, such as the requestor's IP (Internet Protocol) address or encrypted user credential, performs a query against authentication server 17, and compares the results against data from policy repository 15 indicating whether the user identified by the identification data is permitted to make a reservation of network resources.

If allowance validator 21 determines (56) that the requestor is permitted to make the reservation, allowance validator 21 attempts (58) to authorize the service reservation. To perform this authorization, allowance validator 21 compares the current service usage on network 10 with applicable user, group and service allowances. The current service usage on network 10 is stored in, and retrieved from, repository 25. For example, allowance validator 21 may compare the current service usage for a particular CoS with the service allowance for that CoS for the service reservation requester. If allowance validator 21 determines (60) that there are sufficient resources available to the requester (i.e., that the requester has not already reserved the maximum amount of resources pre-allotted to the requester), allowance validator 21 authorizes the service reservation and informs (62) engine 26 that the service reservation is valid. If the requestor fails authentication (56) or authorization (60), allowance validator 21 informs (64) engine 26 that the reservation is not valid. The reservation is then not made. Alternatively, the reservation may be queued for later authorization and validation.

When a service reservation is terminated (FIG. 7B), either at completion of the service, through user cancellation, or through failure to pass resource validation (see below), engine 26 informs allowance validator 21 that the reservation is to be removed. In response, allowance validator 21 updates data in the network resource manager repository 25 indicating what services are currently in use on network 10. Optionally, when a future service reservation becomes due, engine 26 passes the reservation to allowance validator 21 for re-authentication and re-authorization. Alternatively, re-authentication and re-authorization may not be performed on the reservation. Rather, an authenticated and authorized reservation may simply be made when it becomes due.

Figure 8:
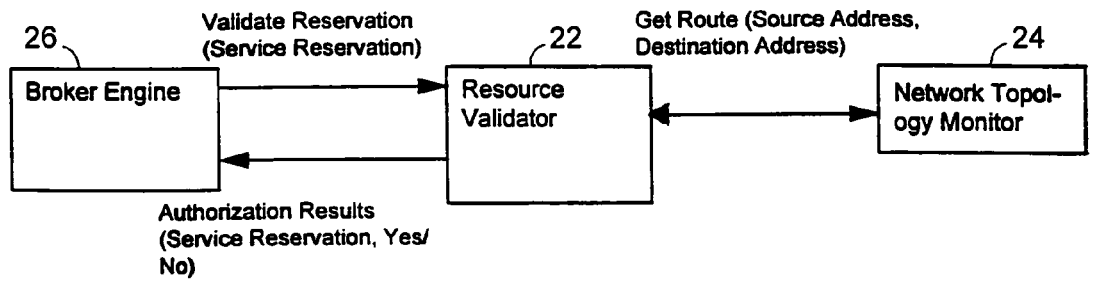
Figure 13:
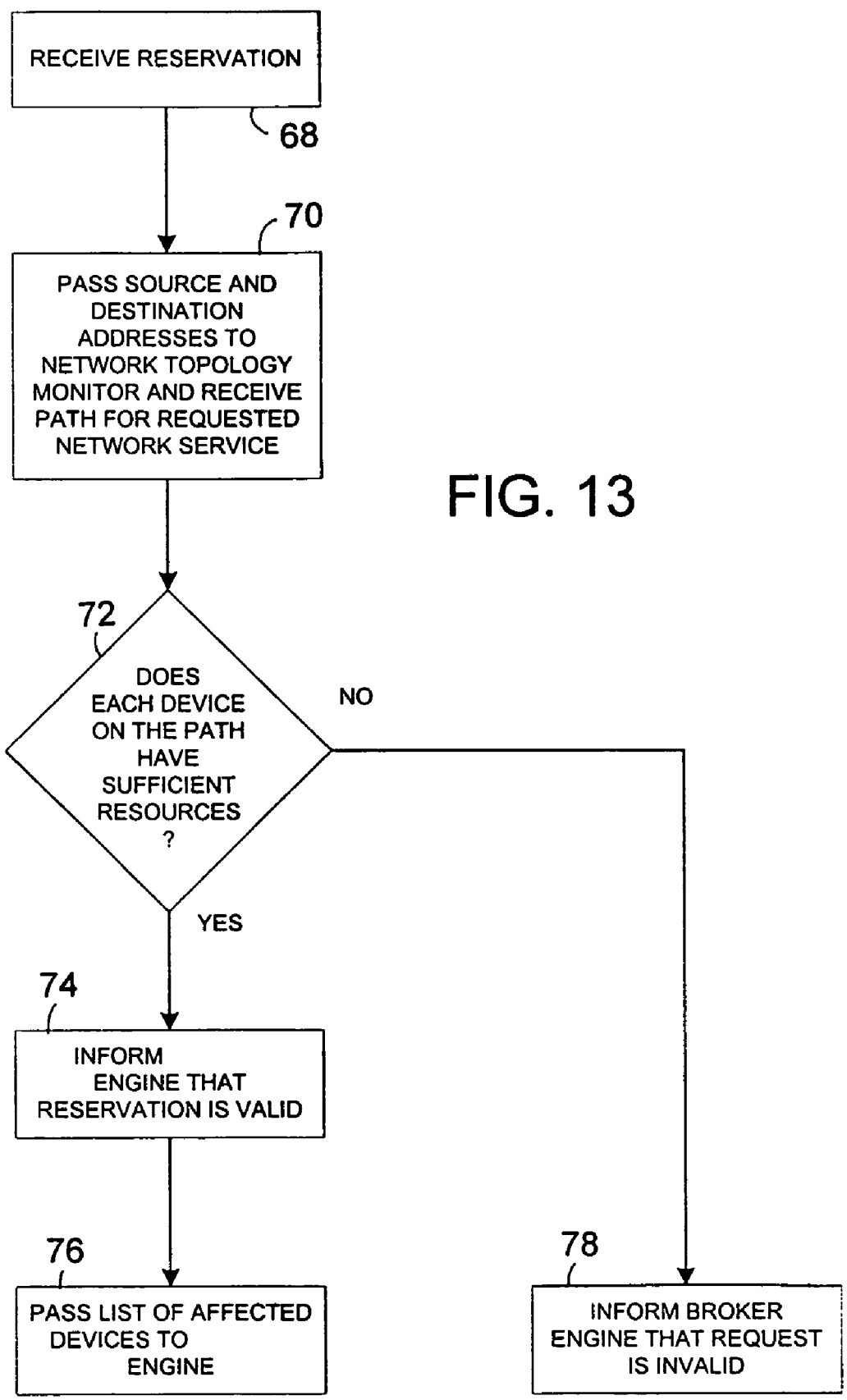
FIG. 13 is a flowchart showing a process performed in the network resource manager for determining if there are sufficient network resources to accommodate the service reservation.

Referring to FIGS. 8 and 13, resource validator 22 validates current and future service reservations by comparing resource requirements for the requested service against available and currently-committed resources on the network. Engine 26 passes new service reservations to resource validator 22 once they have been approved by allowance validator 21. Resource validator 22 receives (68) the new service reservations and passes (70) source and destination network addresses from the service reservations to network topology monitor 24 (see below). Network topology monitor 24 obtains a path(s) for the requested service. For example, network topology monitor 25 may perform the Dijkstra shortest-path process using link data received from a link state protocol such as OSPF (Open Shortest Path First). Network topology monitor 24 then provides that path to resource validator 22, where the path is received. The invention is not limited to use with OSPF. Rather, any link state protocol may be used, another example of which is the IS-IS (Intermediate System to Intermediate System) protocol.

To validate a service reservation, resource validator 22 determines (72) if links along the path determined by network topology monitor 24 have sufficient available resources to accommodate the requested service. For example, if the service reservation is for bandwidth on network 10, resource validator 22 determines, based on current network and device bandwidth data, whether each link (e.g., device) along the path on network 10 has sufficient bandwidth to accommodate the service reservation.

Certain links within the network topology may be validated, while other links are ignored. That is, resource manager may not manage links to certain network devices, depending, e.g., on the bandwidth available in those links (which may be determined by the resource manager or stored beforehand). This is useful if some links have a relatively high capacity and, thus, do not need to be managed by resource manager 11. Whether a link needs to be managed may be determined by the network administrator. That is, if the packet is to be transferred over a high bandwidth path, then resource manager may simply allow the packet to be transferred, without allocating bandwidth along the path.

If there are sufficient available resources in each link (e.g., device) to accommodate the current service reservation, resource validator 22 responds (74) to engine 26 that the reservation is valid. In the case of a valid reservation, resource validator 22 also passes (76) to engine 26 a list of network devices that are affected by the reservation. Network devices that are affected include those along the path determined by network topology monitor 24. If there are not sufficient network resources available to accommodate the service reservation (72), resource validator 22 responds (78) to engine 26 with an indication that the service reservation is not valid. The reservation is then not made. Alternatively, another path, e.g., a path that is not the shortest path through the network, may be mapped, and that path tested to see if it contains sufficient network resources to accommodate the service reservation. In this case, the device supports explicit routing, such as the MPLS (MultiProtocol Label Switching) protocol. If so, the reservation may be made on that new path.

In the event of a change in the topology of the network, network topology monitor 24 informs resource validator 22 of the change. Resource validator 22 uses this data to determine if the change affects any active service reservations on network 10 (obtained from repository 25). If an active service reservation is adversely affected by the change in network topology, resource validator 22 instructs engine 26 to terminate the current service and updates current resource allocation data in repository 25. Resource validator 22 may also determine if a change in the topology of the network will affect any reservations that have not yet come due and, if so, resource validator 22 instructs engine 26 to consider alternative paths through the network for the not-yet-due reservations.

Network topology monitor 24 detects changes in the topology of network 10 and supports automatic discovery of devices on network 10. Network topology monitor 24 also monitors link states of the devices on network 10 and uses these link states to determine the shortest path(s) available between source and destination network addresses. Alternatively, other paths, such as the least cost path may also be determined. Network topology monitor 24 obtains the link states of devices on network 10 using a link-state protocol such as OSPF or IS-IS, and also obtains a maximum bandwidth per link via mechanism adapter 19. The maximum bandwidth per link may also be provisioned through a command-line interface on the resource manager or stored within the policy repository. This data is mapped to links in network 10 and is used to update the dynamic topology map of network 10 stored in repository 25.

Network topology monitor 24 determines a path based on dynamic (i.e., current) topology data that it learns from the network. Network topology monitor 24 is able to maintain the current dynamic topology since it is informed of link state changes by the link-state protocol it is using. The dynamic network topology map is updated based on those link state changes.

Network topology monitor 24 may also be provisioned statically (i.e. network 10's topology is described manually), through the resource manager's command-line interface or through the policy repository. The network topology stored within network topology monitor 24 may be a combination of dynamic (automatically learned) information and static (manual) information. Network topology monitor 24 merges the information learned with the information entered manually to come up with a consistent network topology.

Mechanism adapter 19 issues queries for device states and links and provides an interface for any components of network resource manager 11 that require device state and link data. Mechanism adapter 19 also activates and deactivates service reservations at network devices by configuring those devices to support services on network 10. Configuration is performed by installing IP traffic filters, flow identifiers, and/or CoS parameters on network device (or, more generally, PEP) on the edge of a network, the path through which is determined by network topology monitor 24. For example, if a service reservation specifies that packets from a particular network address having one CoS (e.g., high priority packets) are to be given access to bandwidth before packets from that same network address having another CoS (e.g., low priority packets), mechanism adapter 19 installs appropriate filters, flow identifiers, and CoS parameters on PEPs (e.g., network device) on the path determined by network topology monitor 24. The filters are installed on PEPs on the edge of a network. Mechanism adapter 19 may also implement a request/response protocol such as COPS/RSVP, in which case the activation and deactivation of service reservations is performed by responding to a device's request for service. This method of activation and deactivation may be used in parallel with the method of activation and deactivation that installs IP traffic filters.

For an active service reservation, mechanism adapter 19 maintains the state of devices configured for the reservation. Mechanism adapter 19 also handles deactivation and deletion of service reservations. Deactivating and deleting service reservations involves removing reservations artifacts for the designated reservations from the network devices.

Mechanism adapter 19 communicates with network devices via one or more protocols. Examples of protocols that may be used to effect such communication include SNMP (Simple Network Management Protocol), COPS-RSVP, COPS-PR (Common Open Policy Service—Provisioning), and CLI (Command Line Interface). SNMP is a network monitoring and control protocol. COPS is a query response protocol used to exchange policy data between a network policy server and a set of clients. RSVP is a communication protocol that signals a router to reserve bandwidth for real-time transmission of data. CLI is an interface that is employed when a user is logged onto a network device directly. It is noted that the invention is not limited to use with the foregoing protocols and that all such protocols are not required.

Figure 9A:
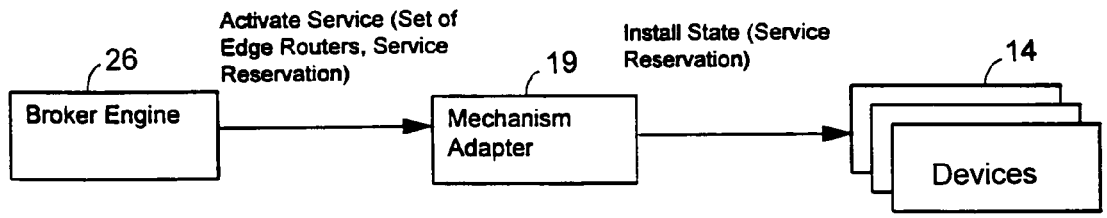
Figure 9B:
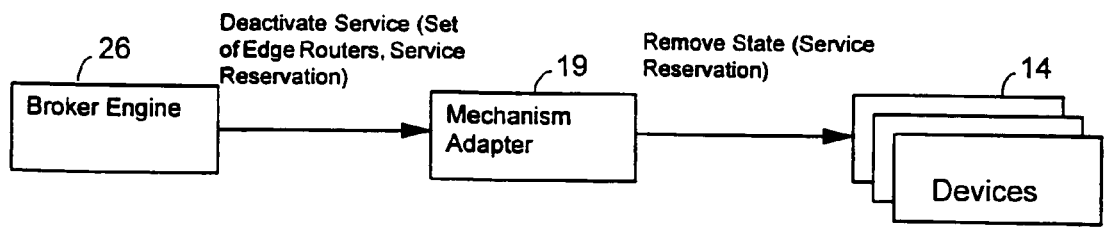

Referring to FIG. 9, when a service reservation becomes due (e.g., a current reservation has been received or the time for processing a future reservation has arrived), engine 26 instructs mechanism adapter 19 to activate the service (FIG.

9A). Engine 26 provides mechanism adapter 19 with the list of devices affected by the reservation, which was received from resource validator 22. Mechanism adapter 19 communicates with those network devices 14 to provide the network devices with the filters, flow identifiers, CoS parameters, and/or any other items that are required to implement the service. If a protocol such as COPS/RSVP is used, mechanism adapter 19 responds to the device with a message to install the reservation, if the reservation is a current reservation. If the reservation is a future reservation, mechanism adapter 19 implements an "RSVP rendezvous", in which it waits for the device to make a request through COPS/RSVP before mechanism adapter 19 gives a positive response. Since it may be possible that the original future reservation did not contain all the data required to perform resource and allowance validation (i.e. a future reservation may specify only the source network address of the packet transfer and the service agent's credentials), when the device makes its request, mechanism adapter 19 may have to perform resource and/or allowance validation on the request.

When a service reservation terminates (FIG. 9B), engine 26 instructs mechanism adapter 19 to deactivate the service. In response, mechanism adapter 19 communicates with the necessary network devices 14 to remove any configuration data specific to the deactivated service. When the state of a network device changes, mechanism adapter 19 notifies listening components, such as network topology monitor 24, within network resource manager 11. If a protocol such as COPS/RSVP is used, mechanism adapter 19 sends an unsolicited message to the device to remove a reservation.

II. Aggregating Filters on the Network

Figure 10:
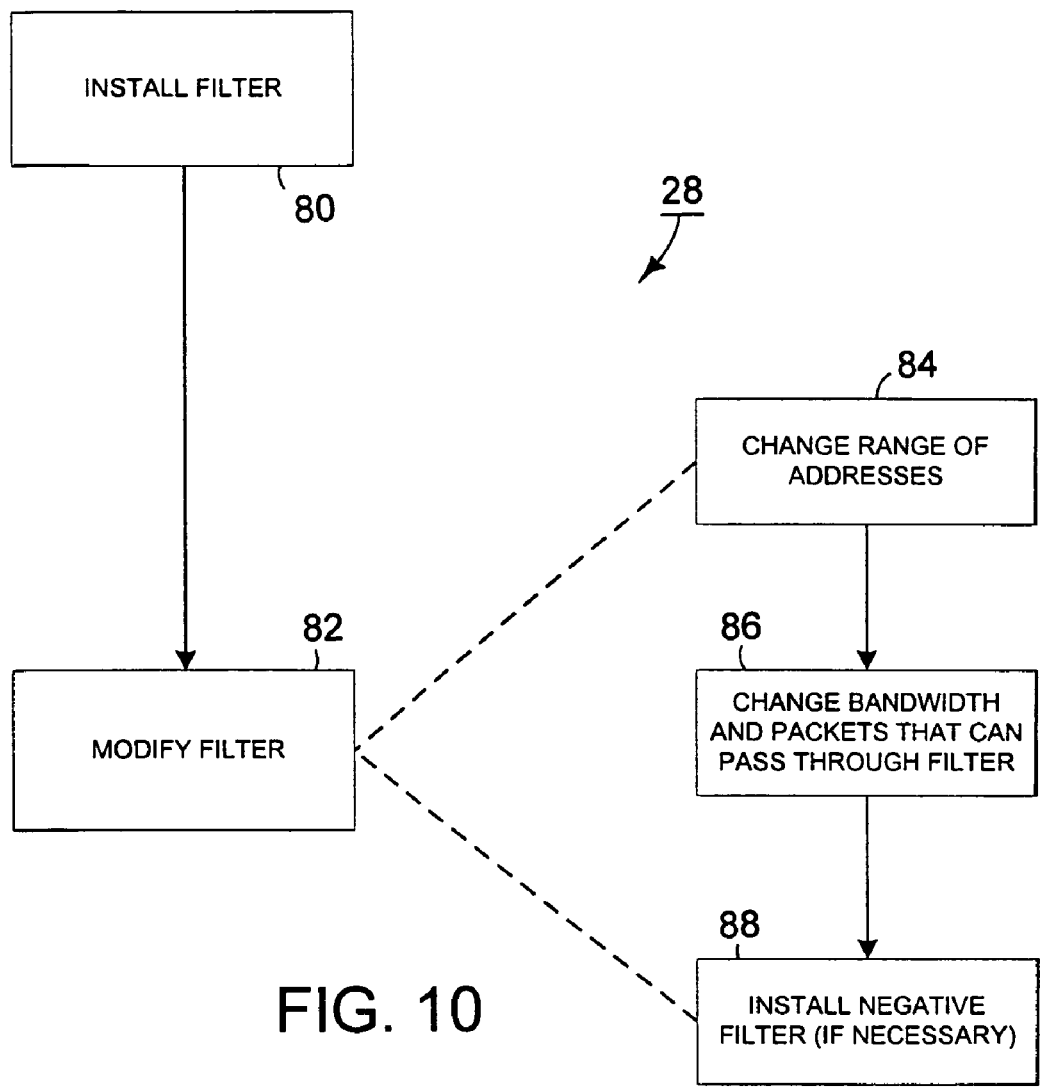
FIG. 10 is a flowchart showing a process for modifying (aggregating) filters installed on network devices by the network resource manager.

Referring to FIGS. 2, 9 and 10, network resource manager 11 may install (80) filters on network devices in order to activate and/or deactivate service reservations on the devices. The filters typically perform several functions. For example, the filters may assign different levels of priority to different types of packets by marking the packet headers (e.g., adding, deleting, or changing data therein).

The filters also police packets being transmitted through the network. What is meant by "police," in this context, is to limit the number of packets of a particular priority level that are transmitted through the network device. For example, a filter may limit the bandwidth available to high priority packets to 64 Kbps (kilobits per second). Any high priority packets in excess of 64 Kbps may be dropped, re-marked or "shaped". Shaping refers to queuing excess packets, particularly packets from "bursty" traffic, in order to preserve as many packets as possible while still performing the policing function. For example, if the bandwidth available for high priority packets is 64 Kbps and a filter receives 128 kilobits in a second, the excess 64 kilobits from the 128 kilobits may be queued and transmitted after the initial 64 kilobits, assuming that there is enough buffer space on the device. Shaping smoothes "bursty" traffic.

A filter is defined by two attributes: a matching criteria and an action. Matching criteria such as a source and/or destination address, protocol number, port number, etc., allow the device to identify a packet and perform an action on it. Actions include dropping, shaping, and marking.

Typically, network devices at the "edge," or entry point, of a network are provided with filters that perform marking, policing, shaping and routing functions. The edge of a network is determined relative to a host device that generates and transmits the packets. For example, in FIG. 1, network device 30 is at the edge of network segment 10a relative to host device 14a.

The number of filters that can be installed on any single network device is typically limited. For example, conventional routers only allow thirty-two filters to be installed. These filters are configured as one per network interface, resulting in a limit of thirty-two service reservations per interface.

Referring to FIG. 10, in process 28, installed filters are modified (82) to increase the number of users with access to the network without increasing the number of filters installed per device. More specifically, a filter contains a single predetermined network address, such as an IP address, to which the filter applies. For instance, the filter may specify IP address 47.100.100.3. Packets transmitted from that address match the filter's criteria, are processed in accordance with the network resources allocated to that address by the filter, and are routed accordingly. Process 28 changes (84) the single network address in the filter to provide more than one user with the network resources available through the filter. For example, a range of addresses, such as addresses 47.100.100.3 to 47.100.100.8 may be substituted for the single network address in the filter. This is done by mechanism adapter 19, in response to instructions by engine 26. Mechanism adapter 19 communicates with each network device along the route determined by network topology monitor 24 to modify installed filters appropriately.

Filters are modified to include a range of addresses when two network devices (or nodes) request the same service reservation. Engine 26 determines whether two nodes have requested the same service reservation and, if so, instructs mechanism adapter to change the address of installed filters to range(s) of addresses, as is appropriate under the circumstances. Using a single filter for two or more network addresses is referred to herein as "aggregating" the filter to accommodate multiple service reservations.

Network resource manager 11 may also modify filters in network devices to change (86) the amount of bandwidth available to a particular device and/or to change an amount of a particular level of data that can be transmitted through the filter. For example, mechanism adapter 19 may communicate with a filter on network 10 to change the amount of high priority packets that the filter will transmit per service reservation.

As part of its policing function, a filter notifies source network devices or the resource manager if packets from the source devices are being dropped. If a source device (or resource manager) determines that an inordinate or unexpected number of packets are being dropped, the source device (or resource manager) may transmit a message to the network administrator and/or to network resource manager 11 indicating that there is a problem with the filter. For example, modifying the filter to operate on a range of network addresses may have the unintended consequence of allowing third parties to transmit packets through the filter. In the example given above, if the two intended parties have addresses of 47.100.100.3 and 47.100.100.8 that are within the range of addresses provided by the filter, an unintended third party with an address of 47.100.100.5 will also be able to transmit data packets through the filter.

To determine if an unintended third party is transmitting data through the filter, mechanism adapter 19 may install monitoring filters on any network device(s) in question. Such filters determine which network addresses are transmitting data through the filter. If it is determined that an unintended third party is transmitting data through the filter, mechanism adapter 19 can install (88) a negative filter on the network device. A negative filter prevents a particular network address or range of addresses from transmitting data through an installed filter. So, for the example given above, mechanism adapter 19 may install a negative filter preventing address 47.100.100.5 from transmitting data through the installed filter.

III. Oversubscribing the Network

Network resource manager 11 can also be used to control the amount of resources available to users on the network. Specifically, network resources may sometimes be reserved, yet remain unused, resulting in wasted resources. By oversubscribing resources, network resource manager 11 is able to reduce wasted resources on network 10 without significant adverse effects to its resource-committed clients.

Figure 11:
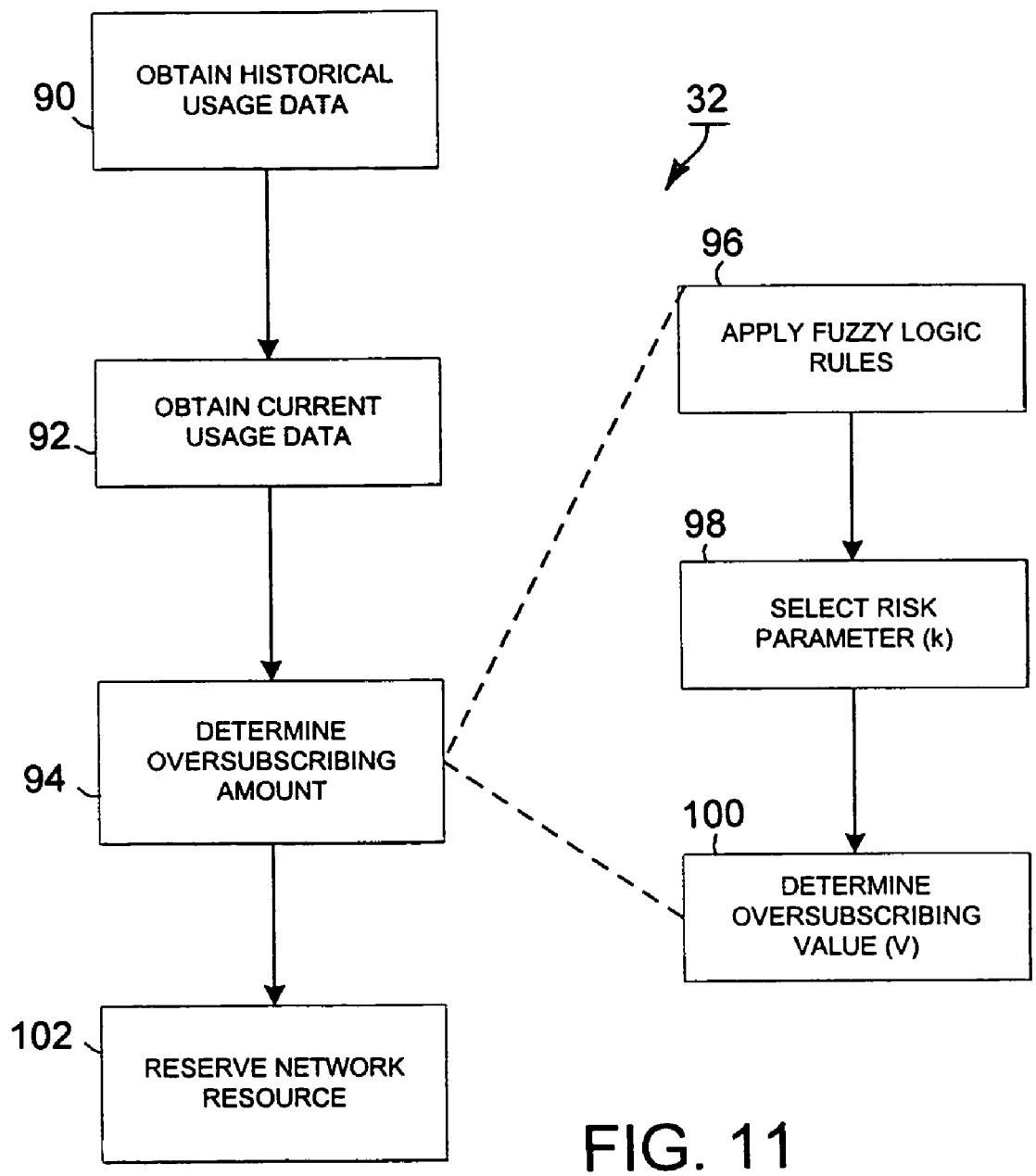
FIG. 11 is a flowchart showing a process for determining an amount by which resources on the network can be oversubscribed.

Referring to FIG. 11, a process 32 is shown by which network resource manager 11 can oversubscribe network resources, such as bandwidth, for its clients. According to process 32, engine 26 obtains (90) historical usage data relating to usage of a network resource in a network device over a period of time. In particular, engine 26 determines an average difference between an amount of the network resource that was reserved over the period of time and an amount of the network resource that was used over the period of time.

Mathematically, this is represented as follows:

$$S^t_{n+1} = (S^t_n + a^t_{n+})/(n+1)$$

where "S" represents the average of the difference between reserved resources and actual resources used, "a" represents the amount of resources that were reserved but not used at a specific time period, "t" represents the time period, and "n" represents a sample count. $S^t_n$ is the previous average, $a^t_{n+1}$ is the sample for the current time period, and $S^t_{n+1}$ is the new average.

Engine 26 determines $S^t_{n+1}$ based on data provided by mechanism adapter 19 and retrieved from repository 25. That is, mechanism adapter 19 queries devices on network 10 in the path determined by network topology monitor 24 for the actual amount of bandwidth used at a specific time "t". Repository 25 stores the count of updates and the latest average ($S^t_n$).

Engine 26 obtains (92) current usage data relating to current usage of the network resource in the network device. In particular, engine 26 determines a difference, "$a_{now}$", between an amount of the network resource that is reserved at a current time and an amount of the network resource that is in use at the current time. As above, mechanism adapter 19 determines the amount of usage of the network resource at the current time and provides this data to engine 26. Engine 26 retrieves the amount of the network resource that is reserved at the current time from repository 25.

Engine 26 determines (94) an amount by which the network resource can be oversubscribed based on $S^t_{n+1}$ and $a_{now}$. Specifically, engine 26 applies (96) values for $S^t_{n+1}$ and $a_{now}$ to stored rules in order to select (98) the value of a risk parameter (k) that is used to determine the oversubscribing amount. The rules may be fuzzy logic rules stored, for example, in repository 25.

Representative examples of fuzzy logic rules that may be used include:

A. If many reserved resources are not used right now $\{a_{now}\}$ and usually $\{S^t_{n+1}\}$ there are not a lot of reserved resources being used at this time, then set the risk parameter $\{k\}$ to be very high.

B. If fewer reserved resources are not being used right now $\{a_{now}\}$ and usually $\{S^t_{n+1}\}$ there are only a small percentage (e.g., 5%) of reserved resources that are not being used at this time, then set the risk parameter $\{k\}$ close to zero.

The bracketed parentheticals above, namely $\{k\}$, $\{a_{now}\}$ and $\{S^t_{n+1}\}$, indicate where the values of k, $a_{now}$, and $S^t_{n+1}$ fit into the above fuzzy logic rules. Thus, according to fuzzy logic rules "A" and "B" above, "k" is set relatively high if $S^t_{n+1}$ indicates that usage of the reserved network resource over the period of time "t" is relatively low and $a_{now}$ indicates that current usage of the reserved network resource is relatively low. On the other hand, "k" is set relatively low (i.e., "close to zero") if $S^t_{n+1}$ indicates that usage of the reserved network resource over "t" is relatively high and $a_{now}$ indicates that current usage of the reserved network resource is relatively high. Predetermined values may be used for the high and low values noted above and in the fuzzy logic rules. Fuzzy sets such as "low risk", "high risk", "many resources", and "few resources", are determined by domain experts using their knowledge and experience. They are scalable according to available resources. When values $a_{now}$ and $S^t_{n+1}$ are presented, a fuzzy inference engine based on fuzzy rules such as (A) and (B) is applied and a value for k is generated. Generally speaking, the higher "k" is set, the more the network resources can be oversubscribed.

Engine 26 uses risk parameter "k" to determine (100) the amount (V) by which the network resource may be oversubscribed. "V" is determined as follows:

$$V = kS^t (k \geq 0),$$

where k and $S^t$ are as defined above. The maximum amount of resources that can be reserved in a device at time period "t" is thus the maximum amount of resources available from the device plus the oversubscribing value "V". Setting values of k too high or too low may lead to oscillations in the amount that the network resources may be oversubscribed. To avoid such oscillations, k may be limited to a range of values.

The maximum amount of resources available from the device is determined by mechanism adapter 19 and reported to engine 26. Engine 26 adds "V" to this value and instructs mechanism adapter 19 to reserve (102) the oversubscribed resources in the network device.

The engine can use other types of rules and techniques for determining the historical and current usage data and for determining an amount of oversubscription. The oversubscribing process is not limited to use with the network resource manager of FIG. 2. Rather, the oversubscribing process can be used in conjunction with any system for controlling access to network resources.

IV. Architecture

The processes described herein are not limited to use with the particular hardware/software configuration of FIGS. 1 and 2; they may find applicability in any computing or processing environment. The processes shown in the flowcharts may be controlled by, and implemented in, computer programs executing on programmable computers that each includes a processor, a storage medium readable by the processor (including volatile and non-volatile memory and/or storage elements), at least one input device, and one or more output devices. Program code may be applied to data entered using an input device to perform the processes described above.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the processes described above. The invention may also be implemented as a computer-readable storage medium, configured with a computer program, where, upon execution, instructions in the computer program cause the computer to operate to control the above processes.

It is to be understood that while the invention has been described in conjunction with the detailed description thereof, the foregoing description is intended to illustrate and not to limit the scope of the invention. Other aspects, advantages, and modifications are within the scope of the following claims.

What is claimed is:

1. A method of allocating resources on a network, comprising:
receiving a request for reservation of network resources, the reservation including a destination address on the network and a future activation time at which the resources are to be activated; and
allocating resources on network devices on a path to the destination address to accommodate the reservation if the network devices have sufficient resources to accommodate the reservation, wherein the allocating is at the future activation time, and wherein the allocating includes communicating over the network at the future activation time with at least one policy enforcement point, wherein the policy enforcement point is on the path and at an edge of the network, wherein the communicating includes configuring the at least one policy enforcement point by installing, at the future activation time, at least one internet protocol traffic filter in the policy enforcement point, wherein the installing activates the requested reservation of network resources for the destination address on the network, wherein the internet protocol traffic filter includes a matching criteria and an action, wherein the matching criteria includes at least one internet protocol network address, and wherein the matching criteria allows the policy enforcement point to identify at least one packet and to perform the action on the packet, wherein the installing at the future activation time of said at least one internet protocol traffic filter in the policy enforcement point includes determining that two nodes have requested the same service reservation, and modifying, responsive to the determining that two nodes have requested the same service reservation, the matching criteria of a previously installed internet protocol traffic filter by replacing an internet protocol network address of the previously installed internet protocol traffic filter with a range of internet protocol network addresses to increase the number of users with access to the network without increasing the number of filters installed in the network devices.

2. The method of claim 1, further comprising determining if the network devices on the path to the destination address have sufficient resources to accommodate the reservation.

3. The method of claim 2, further comprising:
constructing a map of a topology of the network; and
storing the map in memory; wherein determining and allocating are performed by referencing the map.

4. The method of claim 3, wherein constructing is performed periodically to account for changes in the topology of the network.

5. The method of claim 1, further comprising:
determining if the reservation is permitted based on an identity of a transferor; and
wherein allocating is performed if it is determined that the reservation is permitted.

6. The method of claim 5, wherein allocating is not performed if it is determined that the reservation is not permitted.

7. The method of claim 1, wherein allocating comprises allocating resources on the network devices for different classes of service on the network.

8. The method of claim 7, wherein the different classes of service are defined in data packets to be transmitted over the network.

9. The method of claim 1, wherein the resources comprise bandwidth of devices on the network.

10. The method of claim 1, further comprising determining if the destination address is along a path having greater than a predetermined amount of bandwidth;
wherein allocating is performed based on the determining.

11. The method of claim 1, wherein the communicating over the network with the at least one policy enforcement point at the activation time takes place using the COPS/RSVP protocol.

12. The method of claim 1, wherein the action performed by the policy enforcement point comprises marking a packet header of the packet to assign a predetermined priority to the packet.

13. The method of claim 1, wherein the action performed by the policy enforcement point comprises shaping the packet.

14. The method of claim 1, wherein the action performed by the policy enforcement point comprises dropping the packet.

15. A computer program stored on a computer-readable medium for allocating resources on a network, the computer program comprising instructions that cause a computer to:
receive a request for reservation of network resources, the reservation including a destination address on the network and a future activation time at which the resources are to be activated; and
allocate resources on network devices on a path to the destination address at the future activation time to accommodate the reservation if the network devices have sufficient resources to accommodate the reservation, by communicating over the network at the future activation time with at least one policy enforcement point, wherein the policy enforcement point is on the path and at an edge of the network, wherein the communicating includes configuring the at least one policy enforcement point by installing, at the future reservation time, at least one internet protocol traffic filter in the policy enforcement point, wherein the installing activates the requested reservation of network resources for the destination address on the network, wherein the internet protocol traffic filter includes a matching criteria and an action, wherein the matching criteria includes at least one internet protocol network address, and wherein the matching criteria allows the policy enforcement point to identify at least one packet and to perform the action on the packet, wherein the installing at the future activation time of said at least one internet protocol traffic filter in the policy enforcement point includes determining that two nodes have requested the same service reservation, and modifying, responsive to the determining that two nodes have requested the same service reservation, the matching criteria of a previously installed internet protocol traffic filter by replacing an internet protocol network address of the previously installed internet protocol traffic filter with a range of internet protocol network addresses to increase the number of users with access to the network without increasing the number of filters installed in the network devices.

16. The computer program of claim 15, further comprising instructions that cause the computer to determine if the network devices on the path to the destination address have sufficient resources to accommodate the reservation.

17. The computer program of claim 16, further comprising instructions that cause the computer to:
construct a map of a topology of the network; and store the map in memory;
wherein determining and allocating are performed by referencing the map.

18. The computer program of claim 17, wherein constructing is performed periodically to account for changes in the topology of the network.

19. The computer program of claim 15, further comprising instructions that cause the computer to:
determine if the reservation is permitted based on an identity of a transferor;
wherein allocating is performed if it is determined that the reservation is permitted.

20. The computer program of claim 19, wherein allocating is not performed if it is determined that the reservation is not permitted.

21. The computer program of claim 15, wherein allocating comprises allocating resources on the network devices for different classes of service on the network.

22. The computer program of claim 21, wherein the different classes of service are defined in data packets to be transmitted over the network.

23. The computer program of claim 15, wherein the resources comprise bandwidth of devices on the network.

24. The computer program of claim 15, further comprising instructions that cause the computer to determine if the destination address is along a path having greater than a predetermined amount of bandwidth wherein allocating is performed based on the determining.

25. The computer program of claim 15, wherein the communicating over the network with the at least one policy enforcement point at the activation time takes place using the COPS/RSVP protocol.

26. An apparatus for allocating resources on a network, the apparatus comprising:
a memory which stores executable instructions;
and a processor which executes the instructions to:
receive a request for reservation of network resources, the reservation including a destination address on the network and a future activation time at which the resources are to be activated; and
allocate resources on network devices on a path to the destination address at the future activation time to accommodate the reservation if the network devices have sufficient resources to accommodate the reservation, by communicating over the network at the future activation time with at least one policy enforcement point, wherein the policy enforcement point is on the path and at an edge of the network, wherein the communicating includes configuring the at least one policy enforcement point by installing, at the future reservation time, at least one internet protocol traffic filter in the policy enforcement point, wherein the installing activates the requested reservation of network resources for the destination address on the network, wherein the internet protocol traffic filter includes a matching criteria and an action, wherein the matching criteria includes at least one internet protocol network address, and wherein the matching criteria allows the policy enforcement point to identify at least one packet and to perform the action on the packet, wherein the installing at the future activation time of said at least one internet protocol traffic filter in the policy enforcement point includes determining that two nodes have requested the same service reservation, and modifying, responsive to the determining that two nodes have requested the same service reservation, the matching criteria of a previously installed internet protocol traffic filter by replacing an internet protocol network address of the previously installed internet protocol traffic filter with a range of internet protocol network addresses to increase the number of users with access to the network without increasing the number of filters installed in the network devices.

27. The apparatus of claim 26, wherein the processor executes instructions to determine if the network devices on the path to the destination address have sufficient resources to accommodate the reservation.

28. The apparatus of claim 27, wherein the processor executes instructions to:
construct a map of a topology of the network; and
store the map in memory wherein determining and allocating are performed by referencing the map.

29. The apparatus of claim 28, wherein constructing is performed periodically to account for changes in the topology of the network.

30. The apparatus of claim 26, wherein:
the processor executes instructions to determine if the reservation is permitted based on an identity of a transferor; and
allocating is performed if it is determined that the reservation is permitted.

31. The apparatus of claim 30, wherein allocating is not performed if it is determined that the reservation is not permitted.

32. The apparatus of claim 26, wherein allocating comprises allocating resources on the network devices for different classes of service on the network.

33. The apparatus of claim 26, wherein the different classes of service are defined in data packets to be transmitted over the network.

34. The apparatus of claim 26, wherein the resources comprise bandwidth of devices on the network.

35. The apparatus of claim 26, wherein:
the processor executes instructions to determine if the destination address is along a path having greater than a predetermined amount of bandwidth; and
allocating is performed based on a determination made by the processor.

36. The apparatus of claim 26, wherein the communicating over the network at the activation time with the at least one policy enforcement point takes place using the COPS/RSVP protocol.

37. An apparatus for allocating resources on a network, comprising:
means for receiving a request for reservation of network resources, the reservation including a destination address on the network and a future activation time at which the resources are to be activated; and
means for allocating resources on network devices on a path to the destination address at the future activation time to accommodate the reservation if the network devices have sufficient resources to accommodate the reservation, and wherein the allocating includes communicating over the network at the future activation time with at least one policy enforcement point, wherein the policy enforcement point is on the path and at an edge of the network, wherein the communicating includes configuring the at least one policy enforcement point by installing at least one internet protocol traffic filter in the policy enforcement point, wherein the installing activates the requested reservation of network resources for the destination address on the network, wherein the internet protocol traffic filter includes a matching criteria and an action, wherein the matching criteria includes at least one internet protocol network address, and wherein the matching criteria allows the policy enforcement point to identify at least one packet and to perform the action on the packet, wherein the installing at the future activation time of said at least one internet protocol traffic filter in the policy enforcement point includes determining that two nodes have requested the same service reservation, and modifying, responsive to the determining that two nodes have requested the same service reservation, the matching criteria of a previously installed internet protocol traffic filter by replacing an internet protocol network address of the previously installed internet protocol traffic filter with a range of internet protocol network addresses to increase the number of users with access to the network without increasing the number of filters installed in the network devices.

* * * * *

UNITED STATES PATENT AND TRADEMARK OFFICE
CERTIFICATE OF CORRECTION

PATENT NO.      : 7,606,146 B1                                            Page 1 of 1
APPLICATION NO. : 09/638373
DATED           : October 20, 2009
INVENTOR(S)     : Pan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this

Fifth Day of October, 2010

David J. Kappos
*Director of the United States Patent and Trademark Office*